(12) United States Patent
Cui et al.

(10) Patent No.: US 11,475,069 B2
(45) Date of Patent: Oct. 18, 2022

(54) CORPUS PROCESSING METHOD, APPARATUS AND STORAGE MEDIUM

(71) Applicant: Beijing Xiaomi Pinecone Electronics Co., Ltd., Beijing (CN)

(72) Inventors: Zhi Cui, Beijing (CN); Kecong Xiao, Beijing (CN); Qun Zhao, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 129 days.

(21) Appl. No.: 17/028,431

(22) Filed: Sep. 22, 2020

(65) Prior Publication Data

US 2021/0319069 A1 Oct. 14, 2021

(30) Foreign Application Priority Data

Apr. 9, 2020 (CN) .......................... 202010274262.2

(51) Int. Cl.
*G06F 17/00* (2019.01)
*G06F 16/9032* (2019.01)
*G06F 40/289* (2020.01)
*G06F 40/30* (2020.01)
*G06K 9/62* (2022.01)

(52) U.S. Cl.
CPC ...... *G06F 16/90332* (2019.01); *G06F 40/289* (2020.01); *G06F 40/30* (2020.01); *G06K 9/6257* (2013.01)

(58) Field of Classification Search
None
See application file for complete search history.

(56) References Cited

U.S. PATENT DOCUMENTS

| 9,432,325 | B2 * | 8/2016 | Skiba | G06F 40/40 |
| 10,530,714 | B2 * | 1/2020 | Ioannou | G06Q 30/0269 |
| 2019/0318283 | A1 * | 10/2019 | Kelly | G06Q 10/1095 |
| 2020/0036660 | A1 * | 1/2020 | Ioannou | G06Q 30/0269 |

OTHER PUBLICATIONS

Extended European Search Report dated Jun. 17. 2021 in European Patent Application No. 20217436.3, 11 pages.
Junjie Yin et al., "A Deep Learning Based Chatbot tor Campus Psychological Therapy", arxiv.org, Cornell University Library, 201 olin Library Cornell University Ithaca, NY 14853, Oct. 9, 2019, XP081515836, pp. 1-31.

* cited by examiner

*Primary Examiner* — Satwant K Singh
(74) *Attorney, Agent, or Firm* — Oblon, McClelland, Maier & Neustadt, L.L.P.

(57) ABSTRACT

The present disclosure relates to a corpus processing method, a corpus processing apparatus and a storage medium. The corpus processing method can include obtaining a message input by a user, retrieving a reply message matching the message input by the user from a plurality of candidate corpora, in which the plurality of the candidate corpora includes candidate corpora obtained after removing a negative emotion corpus, and sending the reply message.

12 Claims, 2 Drawing Sheets

CORPUS PROCESSING METHOD, APPARATUS AND STORAGE MEDIUM

CROSS-REFERENCE TO RELATED APPLICATION

This application claims priority to and benefits of Chinese Patent Application Serial No. 202010274262.2, filed on Apr. 9, 2020, the entire content of which is incorporated herein by reference.

TECHNICAL FIELD

The present disclosure relates to a field of artificial intelligence, including to a corpus processing method, a corpus processing apparatus and a storage medium.

BACKGROUND

Artificial Intelligence (AI) is an emerging science and technology that is currently researched and developed to simulate, extend, and expand human intelligence. A main research goal of AI is to make machines capable of some complex tasks that usually require human intelligence to complete. For example, the chatbot appearing nowadays is a practical application of AI technology.

Currently, for open-domain dialogue systems, open-domain chatbots have become important human-computer interaction products, but in open-domain conversations, the open-domain chatbots need to use a large number of candidate corpora for reply.

SUMMARY

Embodiments of the present disclosure provide a corpus processing method. The method can include obtaining a message input by a user, retrieving a reply message matching the message input by the user from a plurality of candidate corpora, in which the plurality of the candidate corpora includes candidate corpora obtained after removing a negative emotion corpus, and sending the reply message.

Further embodiments of the present disclosure provide a corpus processing apparatus. The apparatus can include a memory configured to store instructions, and a processor configured to call the instructions to implement the corpus processing method according to the above aspect or any of the embodiments of the above aspect.

Additional embodiments of the present disclosure provide a non-transitory computer-readable storage medium storing computer-executable instructions, and when the computer-executable instructions are executed by a processor, the corpus processing method according to the above aspect or any of the embodiments of the above aspect is implemented.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Currently, for open-domain dialogue systems, open-domain chatbots have become important human-computer interaction products, but in open-domain conversations the open-domain chatbots need to use a large number of candidate corpora for reply. Meanwhile, if the open-domain chatbots reply with some negative emotion messages, for example, depression, anger and the like, serious distress may be caused for users, and even worse, the users may be influenced by the negative emotions. Therefore, improving quality of the candidate corpora of the open-domain chatbots to establish positive and active open-domain chatbots has become a technical problem to be solved.

The exemplary embodiments of the present disclosure are applicable to a scenario in which a reply to a message input by a user is required in an open-domain dialogue system. In this scenario, the open-domain dialogue system may include, for example, a user terminal and a human-machine dialogue system. The user terminals include, but are not limited to, smart phones, tablet computers, notebook computers, desktop computers, e-book readers, and other fixed or mobile electronic devices. The human-machine dialogue system is a server, for example, a specific form may be an open-domain chatbot. The user initiates a conversation with the open-domain chatbot by performing dialogue input on a terminal. After receiving the conversation initiated by the user, the open-domain chatbot retrieves the best reply content matching the initiated conversation from candidate corpora and feeds the content back to the user.

Figure 1:
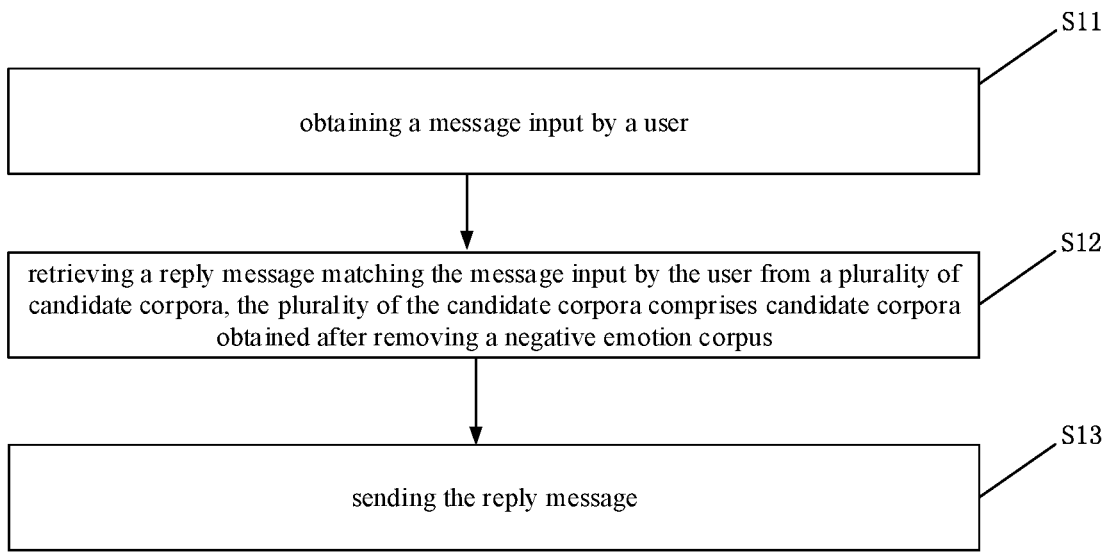
FIG. 1 is a flow chart showing a corpus processing method according to an exemplary embodiment.

FIG. 1 is the flowchart of a corpus processing method according to an exemplary embodiment. Referring to FIG. 1, the corpus processing method is applicable to an open-domain chatbot. The corpus processing method includes the following actions.

At block S11, a message input by a user is obtained. In the present disclosure, a user may have a conversation with an open-domain chatbot based on an application installed in a terminal for conducting a human-machine conversation. In the present disclosure, the obtained message input by the user may be text information or voice information.

At block S12, a reply message matching the message input by the user is retrieved from a plurality of candidate corpora, in which the plurality of the candidate corpora are candidate corpora obtained after removing a negative emotion corpus. Since in an open-domain conversation, the conversation initiated by the user may involve a plurality of fields or scenarios, instead of being limited to a specific field or scenario. For example, the conversation initiated by the user may involve many fields such as family care, children, medical care, education, government agencies, banks, hotels, restaurants, tourist attractions, and the like. Therefore, the open-domain chatbot includes a huge number of candidate corpora containing a large number of corpora representing negative emotions. For example, the corpora may include negative emotions include such as suicide, depression, anger, and the like. If the negative emotion corpora are used to reply to the user, serious distress may be caused to the user, and even worse, mood of the user may be influenced by the negative emotions. Therefore, in the present disclosure, before using a candidate corpus in the open-domain chatbot to reply to the user, the plurality of the candidate corpora are screened for the negative emotion corpora, and the screened negative emotion corpora are removed.

In the present disclosure, for example, the negative emotion corpora may be removed to obtain the plurality of the candidate corpora by obtaining a candidate corpus set, and calling an emotion recognition model, in which the emotion recognition model is configured to output an emotion score according to the corpus. Further, the negative emotion corpora may be removed to obtain the plurality of the candidate corpora by inputting a candidate corpus in the candidate corpus set into the emotion recognition model, and determining the negative emotion candidate corpus in the candidate corpus set according to an output of the emotion recognition model and a preset negative emotion score threshold, and removing the negative emotion candidate corpus to obtain the plurality of the candidate corpora.

The negative emotion score threshold may be a value that represents a range of negative emotion scores. For example, after the candidate corpus is input to the emotion recognition model, the emotion score of the candidate corpus output by the emotion recognition model is 0.2, and the preset negative emotion score threshold is 0.3, which means that the candidate corpus is a negative emotion candidate corpus, and then the negative emotion candidate corpus is removed.

In addition, with the operation of the open-domain chatbot and gradually added candidate corpora, updated candidate corpora in the open-domain chatbot are subjected to the negative emotion recognition, and removing processing may be performed on the identified negative emotion corpus. For example, an updated candidate corpus set is obtained by taking a preset time interval as a unit, a negative emotion candidate corpus in the updated candidate corpus set is determined according to an output of the emotion recognition model, and the negative emotion candidate corpus in the updated candidate corpus set is removed.

At block S13, the reply message is sent. In an exemplary embodiment of the present disclosure, for the open-domain chatbot, by removing the negative emotion candidate corpus in the open-domain chatbot, the open-domain chatbot may output a positive and active reply message according to the message input by the user, to enhancing the closeness of communication between the open-domain chatbot and the user, and improving the user experience.

In the present disclosure, before obtaining the negative emotion corpus by using the emotion recognition model and the preset negative emotion score threshold, the method may further include pre-training the emotion recognition model.

Figure 2:
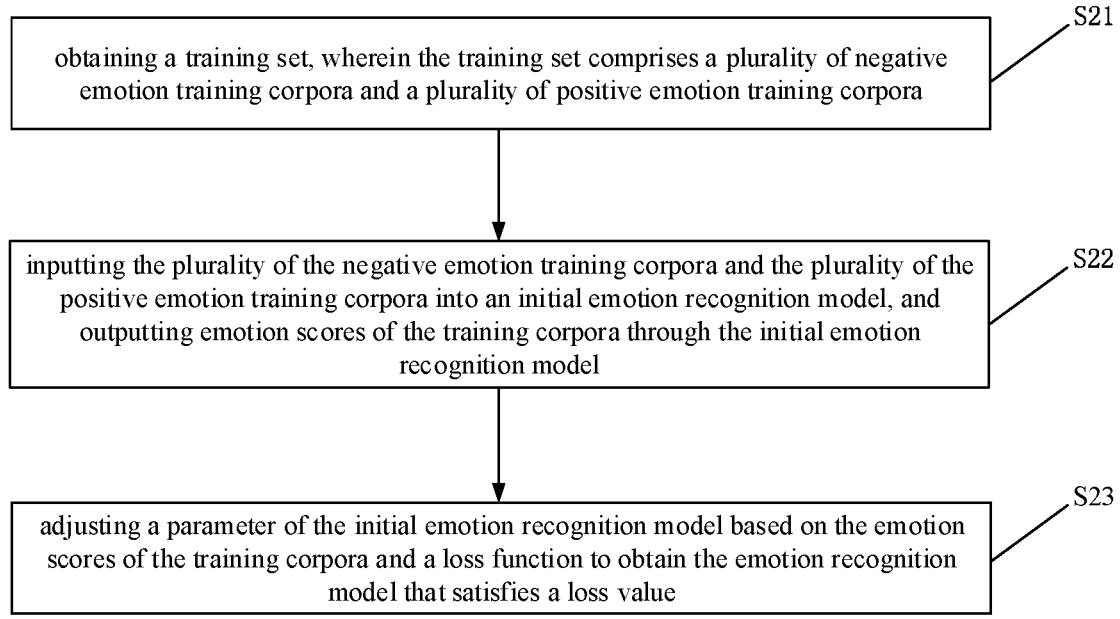
FIG. 2 is a flow chart showing training of an emotion recognition model according to an exemplary embodiment.

FIG. 2 is a flow chart illustrating training of an emotion recognition model according to an exemplary embodiment. Referring to FIG. 2, training the emotion recognition model includes the following actions.

At block S21, a training set is obtained, in which the training set includes a plurality of negative emotion training corpora and a plurality of positive emotion training corpora. The negative emotion training corpora may include training corpora of negative emotions, for example, "I want to commit suicide", "I want to jump off a building", and "I'm so pissed". The positive emotion training corpora may include training corpora of positive emotions, for example, "I am delighted", "I am so joyful", and "I am very happy".

The present disclosure may mark negative-biased emotion training corpora and positive-biased emotion training corpora respectively. For example, a negative-biased emotion training corpus is marked as D−, with a score recorded as 0, and a positive-biased emotion training corpus is marked as D+, with a score recorded as 1.

At block S22, the plurality of the negative emotion training corpora and the plurality of the positive emotion training corpora are input into an initial emotion recognition model, and emotion scores of the training corpora are output through the initial emotion recognition model. In the present disclosure, the emotion recognition model may be obtained by training using a Convolutional Neural Networks (CNN), a Recurrent Neural Network (RNN), or a Bert model. Additionally, in the present disclosure, the plurality of the negative emotion training corpora and the plurality of the positive emotion training corpora are input into the initial emotion recognition model, and the emotion scores of the training corpora are output through the initial emotion recognition model.

At block S23, a parameter of the initial emotion recognition model is adjusted based on the emotion scores of the training corpora and a loss function to obtain the emotion recognition model that satisfies a loss value. Currently, the negative emotion corpus in the corpora is mainly recognized by manual labeling, and the recognition efficiency is low. Especially for the open-domain chatbots, in the face of massive corpora, it is difficult to identify the negative emotion corpus in the corpora by manual labeling. Therefore, in order to improve the efficiency of identifying the negative emotion corpus and save labor cost, the present disclosure may recognize the negative emotion corpus through the emotion recognition model, thereby improving the efficiency of identifying the negative emotion corpus and saving labor costs.

In the present disclosure, the plurality of the negative emotion training corpora and the plurality of the positive emotion training corpora are input to the initial emotion recognition model, and emotion prediction scores of the training corpora are obtained through the emotion recognition model. If a score given by the emotion recognition model approaches 1, the corpus is a positive emotion training corpus, and if a score given by the emotion recognition model approaches 0, the corpus is a negative emotion training corpus. An error between a prediction score and an identifier corresponding to the training corpus is calculated according to the loss function, and the parameter of the initial emotion recognition model is adjusted until the error calculated by the loss function is less than the preset threshold, and the emotion recognition model that meets the loss value is obtained. The loss function may be a classification loss function, such as a cross-entropy loss function.

In addition, in order to ensure the coverage and accuracy of the recognition of the negative emotion corpora, the present disclosure may verify the negative emotion corpus in the corpora based on the trained emotion recognition model after obtaining the trained emotion recognition model.

For example, the negative emotion corpus in the corpora may be verified by obtaining a verification set, in which the verification set includes a plurality of negative emotion verification corpora and a plurality of positive emotion verification corpora. Further, it can include the inputting the plurality of the negative emotion verification corpora and the plurality of the positive emotion verification corpora into the emotion recognition model, and outputting emotion scores of the verification corpora through the emotion recognition model, and determining a negative emotion score threshold according to the emotion scores of the verification corpora.

In the exemplary embodiment of the present disclosure, the emotion recognition model is obtained through training, and the negative emotion corpus included in the candidate corpora is recognized based on the trained emotion recognition model, and then the negative emotion corpus included in the candidate corpora is removed according to a recognition result, ensuring that the open-domain chatbot outputs the positive and active reply message, improving the closeness of the communication between the open-domain chatbot and the user, and improving the recognition efficiency by using the emotion recognition model to identify the negative emotion corpus in the corpora.

Based on the same inventive concept, the present disclosure also provides a corpus processing apparatus.

It is understood that, in order to realize the above-mentioned functions, an application control apparatus according to the embodiments of the present disclosure includes hardware structures and/or software modules corresponding to each function. In combination with the units and algorithm steps of the examples disclosed in the embodiments of the present disclosure, the embodiments of the present disclosure may be implemented in the form of hardware or a combination of hardware and computer software. Whether a function is executed by hardware or computer software-driven hardware depends on the specific application and design constraints of the technical solution. Those skilled in the art may use different methods for each specific application to implement the described functions, but such implementation should not be considered as going beyond the scope of the technical solution of the embodiments of the present disclosure.

Figure 3:
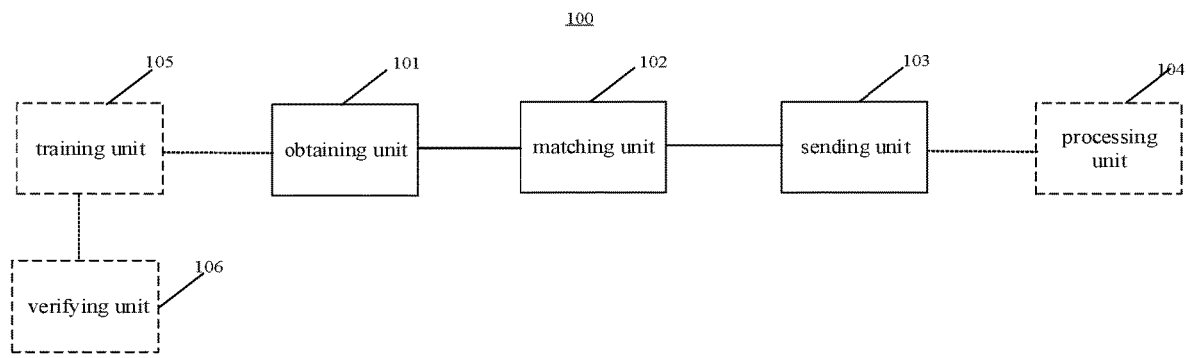
FIG. 3 is a block diagram illustrating a corpus processing apparatus according to an exemplary embodiment.

FIG. 3 is a block diagram of a corpus processing apparatus according to an exemplary embodiment. Referring to FIG. 3, the corpus processing apparatus includes an obtaining unit 101, a matching unit 102, and a sending unit 103. Of course, it should be understood that one or more of the units described in this specification can by implemented by processing circuitry.

The obtaining unit 101 is configured to obtain a message input by a user. The matching unit 102 is configured to retrieve a reply message matching the message input by the user from a plurality of candidate corpora, in which the plurality of the candidate corpora include candidate corpora obtained after removing a negative emotion corpus. The sending unit 103 is configured to send the reply message.

In an embodiment, the corpus processing apparatus further includes a processing unit 104 that is configured to obtain the plurality of the candidate corpora by removing the negative emotion corpus by obtaining a candidate corpus set, and calling an emotion recognition model, in which the emotion recognition model is configured to output an emotion score according to an input corpus. Further, the processing unit can be configured perform the function by inputting a candidate corpus in the candidate corpus set into the emotion recognition model, and determining the negative emotion candidate corpus in the candidate corpus set according to an output of the emotion recognition model and a preset negative emotion score threshold, and removing the negative emotion candidate corpus to obtain the plurality of the candidate corpora.

In an embodiment, the corpus processing apparatus further includes a training unit 105 that is configured to train the emotion recognition model by obtaining a training set, in which the training set includes a plurality of negative emotion training corpora and a plurality of positive emotion training corpora. Additionally, the training unit 105 can be configured to train the emotion recognition model by inputting the plurality of the negative emotion training corpora and the plurality of the positive emotion training corpora into an initial emotion recognition model, and outputting emotion scores of the training corpora through the initial emotion recognition model, and adjusting a parameter of the initial emotion recognition model based on the emotion scores of the training corpora and a loss function to obtain the emotion recognition model that satisfies a loss value.

In an embodiment, the corpus processing apparatus further includes a verifying unit 106 that can be configured to obtain a verification set, in which the verification set includes a plurality of negative emotion verification corpora and a plurality of positive emotion verification corpora, input the plurality of the negative emotion verification corpora and the plurality of the positive emotion verification corpora into the emotion recognition model, and output emotion scores of the verification corpora through the emotion recognition model, and determine a negative emotion score threshold according to the emotion scores of the verification corpora.

In an embodiment, the processing unit 104 in the corpus processing apparatus is further configured to obtain an updated candidate corpus set by taking a preset time interval as a unit, determine a negative emotion candidate corpus in the updated candidate corpus set according to an output of the emotion recognition model, and remove the negative emotion candidate corpus in the updated candidate corpus set.

Regarding the apparatus in the foregoing embodiments, the specific manner in which each unit or module performs the operation has been described in detail in the method embodiments, and detailed description will not be given here.

Figure 4:
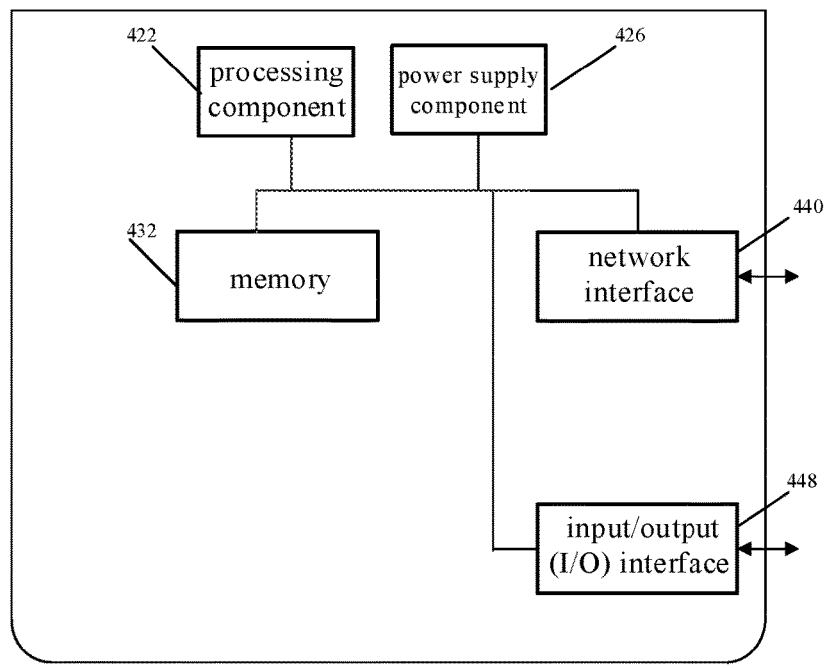
FIG. 4 is a block diagram illustrating an apparatus according to an exemplary embodiment.

FIG. 4 is a block diagram illustrating a corpus processing apparatus 400 according to an exemplary embodiment. For example, the apparatus 400 may be provided as a server. Referring to FIG. 4, the apparatus 400 includes a processing component 422, which further includes one or more processors, and a memory resource represented by a memory 432 for storing instructions that can be executed by the processing component 422, such as application programs. The application program stored in the memory 432 may include one or more modules each corresponding to a set of instructions. In addition, the processing component 422 is configured to execute instructions to execute the aforementioned corpus processing method.

The apparatus 400 may also include a power supply component 426 configured to perform power management of the apparatus 400, a wired or wireless network interface 440 configured to connect the apparatus 400 to a network, and an input/output (I/O) interface 448. The apparatus 400 may operate based on an operating system stored in the memory 432, such as Windows Server™, Mac OS X™, Unix™, Linux™, FreeBSD™, or the like.

It is understood that in this disclosure, "plurality" refers to two or more, and other quantifiers are similar. In addition, it is noted that "and/or" in the text-only describes a relation of the related objects and indicates three relations, for example, "A and/or B" indicates three conditions, i.e., A exists alone, A and B exist simultaneously, and B exists alone. The character "/" generally indicates that it is either the former related object or the latter related object. The singular forms "a", "said" and "the" are also intended to include the majority form unless the context clearly indicates other meanings.

It is further understood that terms such as "first" and "second" are used to describe various information, but the information should not be limited to these terms. These terms are only used to distinguish the same type of information from each other, and do not indicate a specific order or importance. In fact, the expressions "first" and "second" may be used interchangeably. For example, without departing from the scope of the present disclosure, the first information may also be referred to as the second information, and similarly, the second information may also be referred to as the first information.

It is further understood that although the operations are described in a specific order in the drawings in the embodiments of the present disclosure, it should not be construed as requiring that the operations are performed in the specific order shown or in a serial order, or performed all to get the desired result. In certain environments, multitasking and parallel processing may be advantageous.

Other embodiments of the present disclosure will be apparent to those skilled in the art from consideration the description and practice of the disclosure disclosed herein. This disclosure is intended to cover any variations, uses, or adaptive changes of the present disclosure that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A corpus processing method, comprising:
   obtaining a message input by a user;
   retrieving a reply message matching the message input by the user from a plurality of candidate corpora that include candidate corpora obtained after removing a negative emotion candidate corpus; and
   sending the reply message;
   wherein the method further comprises:
   obtaining a candidate corpus set;
   calling, an emotion recognition model that is configured to output an emotion score according to an input corpus;
   inputting a candidate corpus in the candidate corpus set into the emotion recognition model and determining the negative emotion candidate corpus in the candidate corpus set based on an output of the emotion recognition model and a preset negative emotion score threshold; and
   removing the negative emotion candidate corpus to obtain the plurality of the candidate corpora.

2. The method of claim 1, further comprising:
   obtaining a training set that includes a plurality of negative emotion training corpora and a plurality of positive emotion training corpora;
   inputting the plurality of the negative emotion training corpora and the plurality of the positive emotion training corpora into an initial emotion recognition model, and outputting emotion scores of the training corpora through the initial emotion recognition model; and
   adjusting a parameter of the initial emotion recognition model based on the emotion scores of the training corpora and a loss function to obtain the emotion recognition model that satisfies a loss value.

3. The method of claim 2, further comprising:
   obtaining a verification set that includes a plurality of negative emotion verification corpora and a plurality of positive emotion verification corpora;
   inputting the plurality of the negative emotion verification corpora and the plurality of the positive emotion verification corpora into the emotion recognition model, and outputting emotion scores of the verification corpora through the emotion recognition model; and
   determining a negative emotion score threshold based on the emotion scores of the verification corpora.

4. The method of claim 1, further comprising:
   obtaining an updated candidate corpus set by taking a preset time interval as a unit, determining a negative emotion candidate corpus in the updated candidate corpus set based on an output of the emotion recognition model, and removing the negative emotion candidate corpus in the updated candidate corpus set.

5. A corpus processing apparatus, comprising:
   a processor; and
   a memory for storing instructions executable by the processor,
   wherein the processor is configured to implement a corpus processing method comprising:
   obtaining a message input by a user;
   retrieving a reply message matching the message input by the user from a plurality of candidate corpora that includes candidate corpora obtained after removing a negative emotion candidate corpus; and
   sending the reply message; wherein the method further comprises: obtaining a candidate corpus set; calling an emotion recognition model that is configured to output an emotion score according to an input corpus; inputting a candidate corpus in the candidate corpus set into the emotion recognition model and determining the negative emotion candidate corpus in the candidate corpus set based on an output of the emotion recognition model and a preset negative emotion score threshold; and removing the negative emotion candidate corpus to obtain the plurality of the candidate corpora.

6. The apparatus of claim 5, wherein the method further comprises:
   obtaining a training set that includes a plurality of negative emotion training corpora and a plurality of positive emotion training corpora;
   inputting the plurality of the negative emotion training corpora and the plurality of the positive emotion training corpora into an initial emotion recognition model, and outputting emotion scores of the training corpora through the initial emotion recognition model; and
   adjusting a parameter of the initial emotion recognition model based on the emotion scores of the training corpora and a loss function to obtain the emotion recognition model that satisfies a loss value.

7. The apparatus of claim 6, wherein the method further comprises:
    obtaining a verification set that includes a plurality of negative emotion verification corpora and a plurality of positive emotion verification corpora;
    inputting the plurality of the negative emotion verification corpora and the plurality of the positive emotion verification corpora into the emotion recognition model, and outputting emotion scores of the verification corpora through the emotion recognition model; and
    determining a negative emotion score threshold based on the emotion scores of the verification corpora.

8. The apparatus of claim 5, wherein the method further comprises:
    obtaining an updated candidate corpus set by taking a preset time interval as a unit, determining a negative emotion candidate corpus in the updated candidate corpus set according to an output of the emotion recognition model, and removing the negative emotion candidate corpus in the updated candidate corpus set.

9. A non-transitory computer-readable storage medium having stored therein instructions that, when executed by a processor, cause the processor to perform a corpus processing method comprising:
    obtaining a message input by a user;
    retrieving a reply message matching the message input by the user from a plurality of candidate corpora that includes candidate corpora obtained after removing a negative emotion candidate corpus; and
    sending the reply message;
    wherein the method further comprises:
    obtaining a candidate corpus set;
    calling an emotion recognition model that is configured to output an emotion score according to an input corpus;
    inputting a candidate corpus in the candidate corpus set into the emotion recognition model and determining the negative emotion candidate corpus in the candidate corpus set based on an output of the emotion recognition model and a preset negative emotion score threshold; and
    removing the negative emotion candidate corpus to obtain the plurality of the candidate corpora.

10. The storage medium of claim 9, wherein the method further comprises:
    obtaining a training set that includes a plurality of negative emotion training corpora and a plurality of positive emotion training corpora;
    inputting the plurality of the negative emotion training corpora and the plurality of the positive emotion training corpora into an initial emotion recognition model and outputting emotion scores of the training corpora through the initial emotion recognition model; and
    adjusting a parameter of the initial emotion recognition model based on the emotion scores of the training corpora and a loss function to obtain the emotion recognition model that satisfies a loss value.

11. The storage medium of claim 10, wherein the method further comprises:
    obtaining a verification set that includes a plurality of negative emotion verification corpora and a plurality of positive emotion verification corpora;
    inputting the plurality of the negative emotion verification corpora and the plurality of the positive emotion verification corpora into the emotion recognition model, and outputting emotion scores of the verification corpora through the emotion recognition model; and
    determining a negative emotion score threshold according to the emotion scores of the verification corpora.

12. The storage medium of claim 9, wherein the method further comprises:
    obtaining an updated candidate corpus set by taking a preset time interval as a unit, determining a negative emotion candidate corpus in the updated candidate corpus set according to an output of the emotion recognition model, and removing the negative emotion candidate corpus in the updated candidate corpus set.

\* \* \* \* \*